Oct. 9, 1934.                J. E. LINDEMAN                1,975,961
                             CLUTCH MECHANISM
                            Filed March 30, 1931
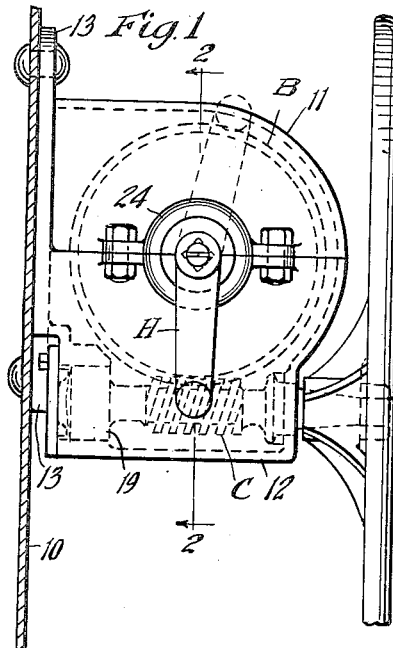
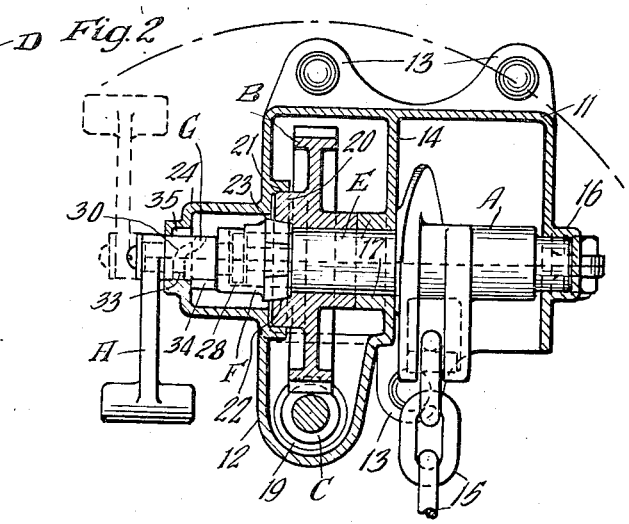
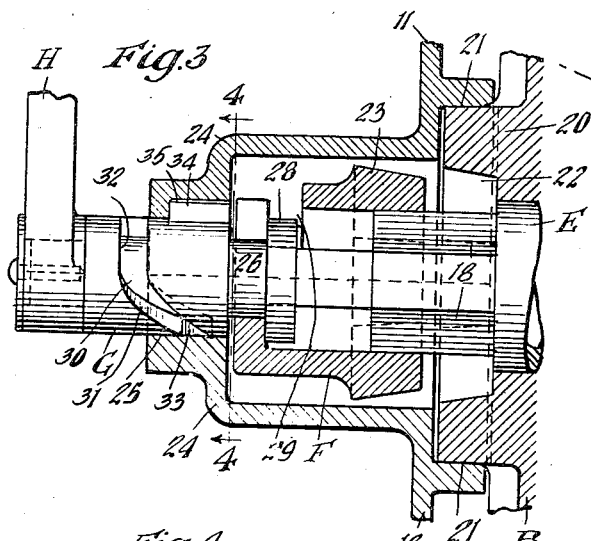
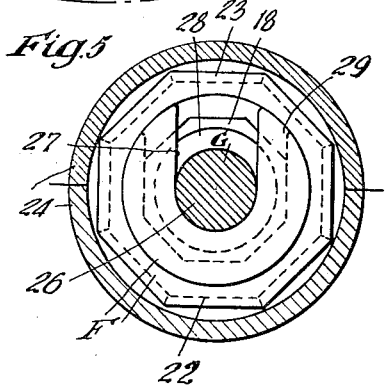
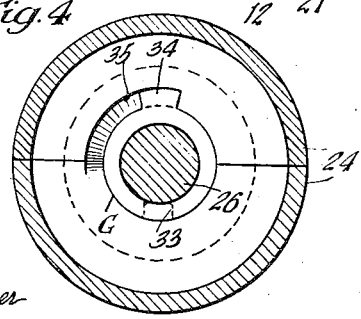
Inventor
James E. Lindeman
Witness
Wm. Geiger
By Henry Fuchs, Atty.

Patented Oct. 9, 1934

1,975,961

UNITED STATES PATENT OFFICE 1,975,961

CLUTCH MECHANISM

James E. Lindeman, Chicago, Ill., assignor to W. H. Miner, Inc., Chicago, Ill., a corporation of Delaware Application March 30, 1931, Serial No. 526,237

4 Claims. (Cl. 192—93)

This invention relates to improvements in clutch mechanisms for hand brakes.

One object of the invention is to provide a hand brake mechanism of the power-multiplying type, wherein in release of the brakes free running of the chain-winding drum with respect to the manually operated actuating means is provided, thus preventing rotation of the latter at such a time, thereby protecting the brakeman against injury, positively actuated releasable clutch means being employed to disconnect the actuating means from the tightening mechanism of the brakes.

A further object of the invention is to provide in a brake mechanism of the character indicated in the preceding paragraph a manually-controlled lever-actuated mechanism for operating the releasable clutch means to throw the clutch into operation and also release the same.

A more specific object of the invention is to provide a power-multiplying hand brake mechanism, especially adapted for railway cars, including a chain-winding element actuated by a cooperating worm gear and worm element to provide for power multiplication in tightening the brakes, the worm element being rotated by a hand wheel and the worm wheel being operatively connected to the winding element by a releasable clutch member which is shiftable in one direction to lock the worm gear member to the winding element and shiftable in a reverse direction to effect release of the clutch member, wherein the clutch member is operated by a manually-actuated mechanism including a swinging lever and cam means rotated thereby for reciprocating the clutch member in reverse directions, the cam means being arranged to automatically lock the clutch in engaging position, thereby preventing accidental release of the same.

In the drawing, forming a part of this specification, Figure 1 is a vertical sectional view through the end wall of a car illustrating my improved hand brake mechanism in connection therewith, the latter being shown in side elevation and certain parts thereof being illustrated in dotted lines. Figure 2 is a vertical sectional view in a plane parallel to the end wall of the car and corresponding substantially to the line 2—2 of Figure 1, the hand wheel of the brakes being shown in dotted lines and the oscillating lever for actuating a certain clutch member being shown in two different positions, one position in full lines and the other in dotted lines. Figure 3 is a view similar to Figure 2, on an enlarged scale showing the mechanism at the left-hand side of Figure 2 only, the shiftable clutch member being illustrated in the released position thereof. Figure 4 is a transverse, vertical sectional view corresponding substantially to the line 4—4 of Figure 3 looking in the direction of the arrows. And Figure 5 is a vertical sectional view on the same plane as Figure 4, but looking in a reverse direction. In said drawing, 10 designates the vertical end wall of a railway car, on which my improved hand brake mechanism is mounted, the mechanism being preferably enclosed in and supported by a housing which is fixed to said end wall.

My improved hand brake mechanism comprises broadly a chain-winding drum A; a worm wheel B; a worm element C; an operating hand wheel D; a shaft E which is fixed to the drum; a sliding clutch member F rotatable with the shaft E and engageable with cooperating clutch means on the worm wheel; a rotatable clutch shifting cam member G; and a lever H for rotating the cam.

In carrying out my invention I preferably mount the improved mechanism within a two-part housing comprising a top section 11 and a bottom section 12. As most clearly shown in Figures 1 and 2, the housing is divided along a horizontal plane and the top and bottom sections thereof have cooperating laterally projecting flanges by which the sections are secured together, bolts or other securing elements being employed, which extend through the flanges. The two housing sections are provided with ear members 13—13 by which the housing is secured to the end wall 10 of the car, rivets being employed for this purpose extending through said end wall and the ears 13. As most clearly shown in Figure 2, the housing is divided into two compartments by a vertical partition wall 14 formed partially on each section of the housing. The top and bottom sections 11 and 12 of the housing are provided with part bearing members at their meeting portions within which certain bearing members of the rotary parts of the brake mechanism are mounted.

The chain-winding drum A is of well-known form and has the usual brake chain 15 attached thereto, the chain leading to the brake mechanism proper of the car. The chain-winding drum, as shown in Figure 2, is disposed in the right-hand chamber of the housing and is rotatably supported by means of the shaft E which may be formed as an integral part of the drum, or may be separate therefrom and keyed thereto. At the right-hand end, as viewed in Figure 2, the shaft E is supported within a hollow bearing boss 16 provided on the corresponding end wall of the housing. At the opposite end the shaft E is supported in a bearing member 17 provided on the partition wall 14 of the housing. As shown in both Figures 2 and 3, the shaft E projects outwardly beyond the bearing 17 and has the worm wheel B rotatably supported thereon. The shaft E extends entirely through the hub of the worm wheel B and has the end 18 thereof formed of non-circular cross section. As shown in Figures 3 and 5, the end 18 is preferably of octagonal cross section, for a purpose hereinafter pointed out.

The worm wheel B meshes with a worm C which is horizontally disposed and supported by a shaft 19 preferably formed integral therewith, the shaft having its opposite ends supported in suitable bearings provided in the bottom section 12 of the housing. The shaft 19 projects outwardly of the housing and has the hand wheel D fixed to said projecting end. As will be evident, when the hand wheel D is rotated the worm C will be rotated therewith, and through its meshing engagement with the worm wheel the latter will also be rotated but at slower speed and with increased power. The worm wheel B has the hub portion at the left-hand end thereof, as viewed in Figures 2 and 3, enlarged as indicated at 20. The enlarged portion 20 of the hub is journaled within a bearing seat 21 provided on the corresponding vertical side wall of the housing. The enlarged portion 20 of the hub member is provided with a clutch seat 22 which is of larger size than the opening in the hub which receives the shaft E. The clutch seat 22 is preferably of octagonal cross section, as clearly shown in Figure 5. As will be evident, the worm wheel B is freely rotatable on the shaft E and in order to operatively connect the same with the shaft E and the chain-winding drum, clutch means which cooperates with the clutch seat of the worm wheel B is employed.

My improved clutching mechanism comprises the sliding clutch member F, the clutch shifting cam G and the lever H hereinbefore referred to. The sliding clutch member F is in the form of a hollow sleeve having an enlarged portion 23 at the right-hand end thereof, as viewed in Figure 3. The enlarged section 23 forms a clutch head cooperating with the clutch seat 22 of the worm wheel B. The clutch head 23 is of octagonal cross section so as to fit within the seat 22 and cause rotation in unison of the clutch sleeve F with the worm wheel B. Both the clutch head 23 and the seat 22 are preferably tapered as shown, so as to facilitate engagement of these parts and also ensure easy release of the clutch mechanism. The sleeve F is slidably mounted on the portion 18 of the shaft E, the opening within the sleeve being of octagonal cross section so as to fit the octagonal end section 18 of the shaft. As will be evident, the clutch sleeve F is thus freely slidable or shiftable inwardly or outwardly with respect to the shaft E but is compelled to rotate in unison therewith. The clutch sleeve is housed within a hollow extension 24 provided on the top and bottom sections of the housing. The outer wall of the portion 24 of the housing is provided with a bearing opening 25 in which the rotary cam member G is journaled. The cam member G is provided with an inward extension 26 of reduced diameter, which extension is accommodated within the opening of the sleeve F. As shown in Figure 3, the left-hand end portion of the opening of the sleeve is reduced in size, as indicated at 27, so as to fit the portion 26 of the clutch shifting cam and form a bearing member therefor. Beyond the portion 26 the member G is formed with an enlarged head 28 which is seated within the larger part of the opening of the sleeve F and has shouldered engagement with the sleeve at the left-hand end thereof, as viewed in Figure 3. The sleeve is thus anchored to the clutch shifting cam G so that these parts will be reciprocated in unison while permitting rotation of the same with respect to each other. The end portion of the sleeve is slotted, as indicated at 29, said slot communicating with the opening 27 so that the cam member G may be readily assembled with the sleeve F by entering the reduced end portion 26 of the cam member through the slot communicating with the opening or bearing member 27. The member G has the lever member H fixed to the outer end thereof, said outer end of the member G being of square cross section and fitting an opening of similar section at the inner end of the lever member. The lever is held in position by means of a locking disc secured to the end of the member G by a screw. As will be obvious the lever may be formed integral with the member G. A guide groove 30 is provided in the member G, said groove having an inclined cam portion 31 and a straight section 32. The section 32 is disposed parallel to a plane at right angles to the axis of rotation of said cam member. The bearing section 24 of the housing is provided interiorly with an outstanding lug 33 which is of cylindrical cross section and fits within the guide groove 30. As will be evident, when the cam member G is rotated the lug 33 will be guided within the groove, thereby causing inward or outward movement of the cam member with respect to the housing. The cam member G is further provided with a fixed abutment lug 34 radially projecting therefrom which is adapted to engage the inner surface of the end wall of the section 24 of the housing immediately adjacent to the bearing member thereof. The top section of the bearing member 25 is cut away, as indicated at 35, to accommodate the lug 34.

The operation of my improved mechanism in tightening the brakes is as follows: Upon rotation of the hand wheel D, the worm member C will be actuated, thereby rotating the worm wheel B. The motion of the wheel B is communicated to the shaft E through the clutch sleeve F, which at this time is in operative engagement with the clutch seat of the worm wheel. Rotation of the shaft E is communicated to the drum A and the chain 15 wound thereon. The chain drum is held against rotation in unwinding direction by the relatively high friction existing between the interengaging portions of the worm and worm wheel. In order to effect quick release of the brakes, the clutch member F is released. To effect this release, the lever H is swung upwardly from the full line position shown in Figures 1 and 2 to the dotted line position. This swinging movement of the lever causes rotation of the cam member G from the position shown in Figure 2 to that shown in Figure 3. During such rotation the lug 33 traverses first the straight portion 32 of the cam groove 30 and then the inclined portion 31 thereof. Due to the inclination of the portion 31, the cam member G will be shifted to the left, thereby causing the sleeve F to be moved in the same direction. The clutch head 23 of the sleeve is disengaged from the clutch seat 22 of the worm wheel B by the shifting action just described. The connection between the driving mechanism and the drum is thus broken and the drum is free to rotate to permit quick unwinding of the chain and release of the brakes. When the brakeman lets go of the lever H, the same will swing from the dotted-line position shown in Figures 1 and 2 to the full-line position shown in said figures under the influence of gravity. However, the brakeman may manually operate the lever in this manner if so desired. During such swinging movement the cam member G will be rotated in a direction reverse to that hereinbefore described. During such rotation the lug 33 traverses first the inclined section 31 of the groove 30 and then the straight section 32 thereof. Due to the inclination of the section 31 of the groove, the cam member G will be moved toward the right, as viewed in Figure 3, thereby also shifting the clutch sleeve F to the right and engaging the clutch head 23 within the seat 22 of the worm wheel B. Driving relation is thus again established between the worm wheel B and the drum shaft E. During the last part of the rotation of the cam member G the lug 33 travels within the straight section 32 of the groove and the cam member is thereby locked against accidental movement to the left, as viewed in Figure 3, thereby preventing a similar movement of the clutch member F and assuring that the same will remain engaged with the clutch means of the worm wheel B. In order to relieve the lug 33 of undue strain, the relatively heavy lug 34 is provided on the cam G. During rotation of the cam member G from the position shown in Figure 3 to that shown in Figure 2, the lug 34 will be brought to the position shown in Figure 2 wherein the same engages the inner face of the end wall of the housing. The lug 34 thus has shouldered abutment with the housing to take the thrust and relieve the lug 33 from strain. Inasmuch as the lug 34 has shouldered engagement with the housing throughout the time that the straight section 32 of the guide slot engages the lug 33, the lug 34 also serves as a locking member to prevent shifting of the cam G to the left, as viewed in Figure 3, and thereby also preventing similar shifting of the clutch sleeve F.

I have herein shown and described what I now consider the preferred manner of carrying out my invention, but the same is merely illustrative and I contemplate all changes and modifications that come within the scope of the claims appended hereto.

I claim:

1. In a mechanism of the character described, the combination with a rotary device; of rotary means for actuating the device; a shiftable, releasable clutch member for operatively connecting rotary means and device; cam means for shifting said clutch member, including a fixed element and a rotary element, one of said elements having a guideway of cam formation, and the other element having means guided by said way; manually-actuated means for operating said rotary element in reverse directions to effect respectively operative engagement and release of the clutch member; and additional cooperating means on said elements having shouldered engagement to take the axial thrust when said clutch member is in operative engagement.

2. In a mechanism of the character described, the combination with a rotary device; of a rotary actuating part having clutch means thereon; a clutch member rotatable with said rotary device and shiftable axially with respect to the same, said clutch member being engaged with said clutch means when shifted in one direction and released when shifted in a reverse direction; cam means for shifting said clutch member including a fixed element and a rotary element, one of said elements having a guideway thereon of cam formation, and the other element having means guided by said guideway; manually-actuated means for operating said rotary element in reverse directions to effect respectively operative engagement and release of the clutch member; and additional cooperating means on said elements having shouldered engagement to take the axial thrust when said clutch is in operative engagement.

3. In a mechanism of the character described, the combination with a rotary device; of a rotary shaft to which said device is fixed, said shaft having a part of non-circular cross section; a clutch sleeve slidably fitting said part of non-circular cross section; a rotary cam member connected to said sleeve for axial movement therewith but freely rotatable with respect to the same, said cam member having a groove thereon, part of which is inclined to a plane intersecting the axis of rotation of said cam member at right angles, and another part of which is parallel to said plane; a fixed lug engaged within said groove; a manually-actuated lever means for rotating said cam member in reverse directions to effect shifting movement of the clutch member; and a driving member freely rotatable with respect to said shaft about the axis thereof, said driving member having clutch means thereon cooperating with said clutch sleeve to operatively connect the driving member to said shaft to rotate said rotary device.

4. In a mechanism of the character described, the combination with a rotary device; of a rotary shaft to which said rotary device is fixed; a clutch sleeve slidable on said shaft and rotatable in unison therewith, said sleeve having a tapered clutch head of octagonal cross section; a driving member rotatable relatively to the rotary device about the axis of said shaft, said driving member having a clutch seat of octagonal shape within which said clutch head is engageable; and a lever means for shifting said clutch sleeve in reverse directions, shifting of said sleeve in one direction effecting engagement of said clutch head with said seat to connect the driving member and rotary device in driving relation, and shifting of said sleeve in the opposite direction withdrawing said clutch head from the seat to disconnect the driving member and rotary device.

JAMES E. LINDEMAN.